Dec. 4, 1934.  J. W. MAY  1,983,383
FASTENING DEVICE FOR STRAPS AND THE LIKE
Filed July 11, 1933
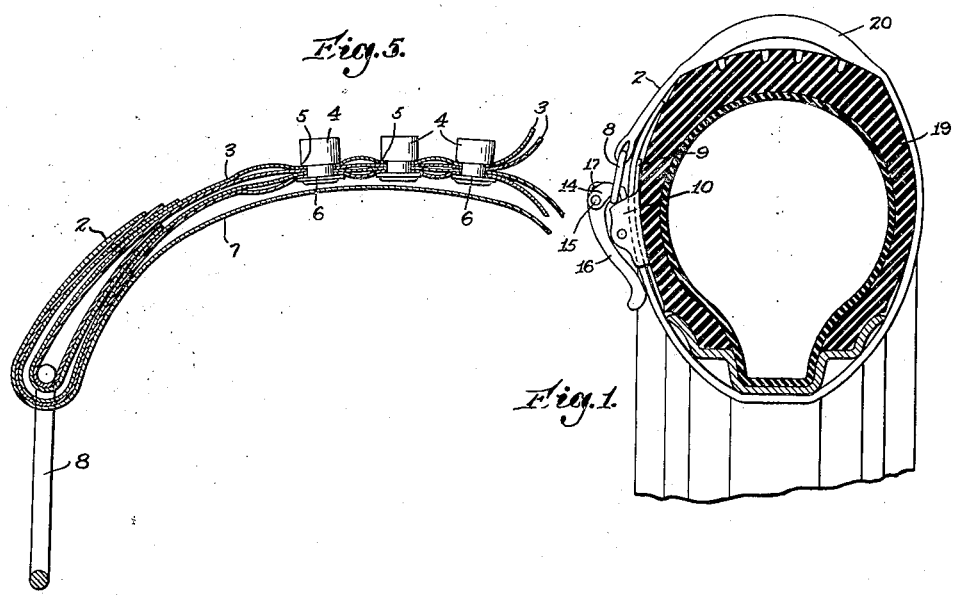
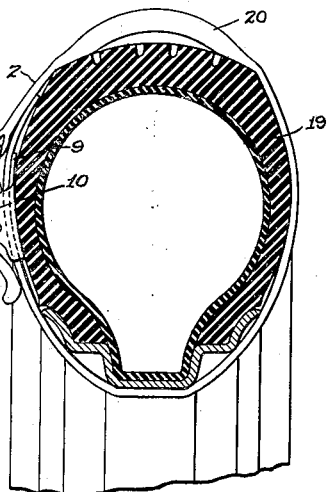
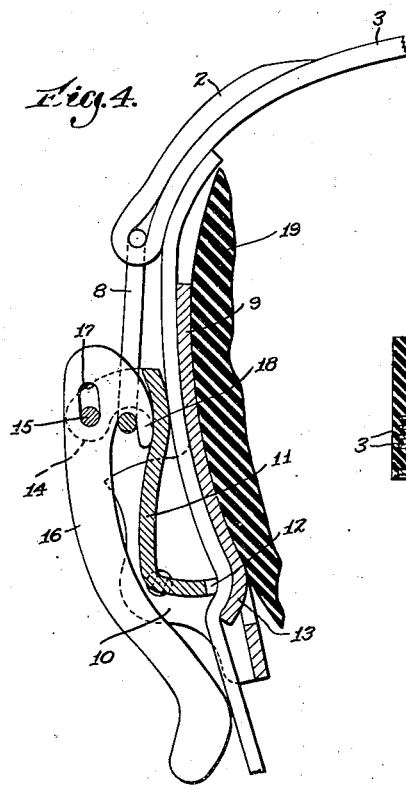
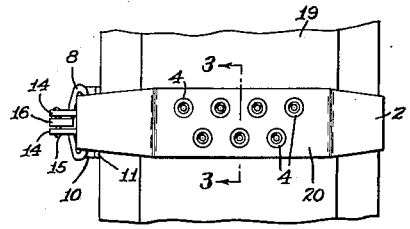
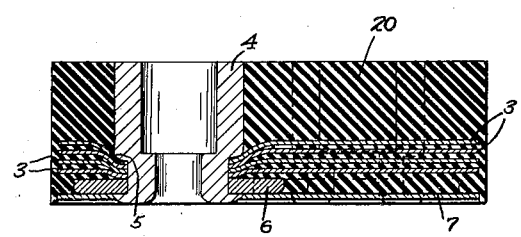
Inventor
J. Walter May
by Kenway & Witter
attorneys Patented Dec. 4, 1934

1,983,383

UNITED STATES PATENT OFFICE 1,983,383

FASTENING DEVICE FOR STRAPS AND THE LIKE

John Walter May, Belmont, Mass.

Application July 11, 1933, Serial No. 679,907

4 Claims. (Cl. 24—74)

My invention relates to devices for detachably connecting the ends of straps, bands and the like to each other or to other parts, and is intended to provide a simple and effective device of this character which will be suitable for use in situations where it is desired to subject the strap or band to tension and so maintain it until it is intentionally released.

My fastening device is particularly adapted and intended for use in connection with non-skid attachments for automobile wheels, of the type comprising a flexible strap which is passed around the tire and rim of the wheel and secured thereto, and accordingly my device is herein described in connection with such an attachment, which, however, is not of itself claimed herein.

In the accompanying drawing illustrating my invention,

Fig. 1 shows an automobile tire in cross section, with a non-skid attachment secured thereto by means of my fastening device as preferably constructed for this purpose;

Fig. 2 is a plan view of the tread portion of the attachment;

Fig. 3 is a section on the line 3—3 of Fig. 2, drawn to a larger scale;

Fig. 4 shows my fastening device, partly in longitudinal section but mainly in side elevation, as applied to the end portions of the attachment to secure them to each other; and Fig. 5 is a detail view illustrating the process of manufacture of the attachment and its application to a loop hereinafter described.

The non-skid attachment shown in the drawing comprises a band portion 2 made up of several thin, rubberized strips 3 of woven fabric laid one upon another and secured together to form a unitary structure, as hereinafter described. To that part of the band 2 which is to overlie the tread surface of the tire are attached a number of metal studs 4, tubular in form, which are located at the outer side of the collective strips 3 and each of which is reduced in diameter at its inner end portion to provide a shoulder 5. Each of the reduced portions is passed through a corresponding perforation in the collective strips and is provided at its free end with a washer 6, said strips being tightly clamped between the washers 6 and the shoulders 5 and held in place by upsetting the inner ends of the studs after the washers have been applied thereto. In this way the strips are firmly secured together and to the studs, which constitute the wear-resisting portion of the attachment and are preferably made of tough steel of as much hardness as is consistent with the upsetting of their inner ends. In order to cover the washers 6 a strip 7, similar to the strips 3 and preferably of the same length, may be applied to the inner face of the combined parts above described.

After the strips 3 and 7 and the studs 4 have been assembled, they are covered with a mass 20 of a suitable vulcanizable rubber compound, such as for example as is used in tire making, which in the area occupied by the studs is equal in thickness to the length of the latter, so that the outer surface of the rubber throughout this area is flush with the outer ends of the studs 4 and its inner surface is flush with their inner ends. The combined parts are then vulcanized in the usual way in a suitable mould, which is preferably so shaped that the area occupied by the studs 4 is arched outwardly somewhat, as shown.

The end portions of the band above described are provided with means for connecting them together after the band has been passed between the spokes and around the tire and rim of an automobile wheel, and thereby securing the attachment thereto, and in order to adapt the attachment for use with tires of various sizes it is desirable to employ connecting means which are adjustable lengthwise of the band. It is also important to be able to secure the attachments very firmly to the tire, to prevent any possibility of its slipping or accidental removal. With these objects in view I have devised the connecting means best shown in Fig. 4, comprising two members secured respectively to the end portions of the band 2. One of these members is a strong metal loop 8 which is preferably attached to one of the extreme ends of the band by passing the ends of the strips of fabric through the loop half in one direction and half in the other in overlapped relation before the rubber compound is applied. In such case the vulcanizing process results in uniting the overlapped ends of the strips so firmly that no other means of attachment of the loop are required. This end of the band is located at such a distance from the thickened portion containing the wear-resisting studs 4 that after the band has been put in place the loop 8 lies on the outside of the wheel, in convenient position to be engaged by the other member of the connecting means.

The member just referred to comprises a metal clip 9 having upturned sides 10 which are separated sufficiently to receive the band 2 between them, and in which is pivoted an angular gripping lever 11, preferably provided at its inwardly extending short end with a few teeth 12 adapted to bite into the top of the band at a point opposite the base of a lip 13 struck up from the bottom of the clip and slanting as shown. When the outer end of the lever 11 is forced downward after the insertion of the band the short end of the lever clamps the band tightly against the lip 13, bending the band sharply at this point, so that a pull tending to withdraw it increases the tightness of the gripping action of the lever 11. At its outer end the lever 11 is provided with a pair of upwardly-projecting ears 14 carrying a transverse pivot 15 on which is mounted an operating lever 16, the pivot being passed through a short longitudinally-extending slot 17 located near one end of the lever and adjacent to a hook 18 formed thereon to receive the loop 8.

To use the attachment the clip 9 is first clamped upon the band 2 at such a point, according to the size of the tire to which it is to be applied, that the attachment when secured to the tire will be subjected to a tension sufficient to hold it firmly in position, and thereafter it can be attached to and removed from the same tire without further adjustment. It is applied to the tire, shown at 19, by locating its thickened tread portion over the tread surface of the tire, moving the long arm of the lever 16 outward and passing it through the loop 8, and then moving it in the opposite direction until it reaches the position shown in Fig. 4. Thereby the loop 8 is located in the hook 18 and the band is subjected to a tension which causes the lever 16 to move longitudinally as far as the slot 17 will permit, with the result that the free end of the loop 8 is brought almost directly below the pivot 15. In consequence, the greater the tension on the band the more effectively the lever is held in its locking position, and it will be evident that this tension has the additional effect of maintaining the gripping lever 11 in engagement with the band, since the lever 16 is carried by the long arm of the lever 11.

The outer edge of the hook-shaped portion of the lever 16 is preferably so shaped that it acts as a cam on the adjacent surface of the lever 11, when the lever 16 is moved outward to release the loop 8, in such manner as to assist in overcoming whatever tension has been applied to the band by the fastening device in connecting its ends. This is a desirable feature of my invention, in that it facilitates the use of my fastening device in cases where it is customary to apply a considerable tension to a band or strap, as for example in strapping trunks and the like. Other advantageous features of the device reside in the means for applying tension to a strap or band, and in its adjustability to any position thereon without danger of slipping under any tension that may be applied. It will be evident that these features render my device adaptable to a variety of uses, and that its details of construction may be modified in various ways without departing from my invention.

I claim:

1. Means for connecting the end portions of a band subjected to tension, comprising a loop adapted to be secured to one end of the band, a clip adapted to embrace the other end portion of the band and carrying a gripping lever to clamp the band against the bottom of the clip, and an operating lever pivotally mounted on the gripping lever and provided with a hook to engage the loop.

2. Means for connecting the end portions of a band subjected to tension, comprising a loop adapted to be secured to one end of the band, a clip adapted to embrace the other end portion of the band, an angular gripping lever pivotally mounted on the clip and arranged to clamp the band between its short arm and the bottom of the clip, and an operating lever pivotally mounted on the other arm of the gripping lever and having a hook on its inner end to engage the loop, with provisions for a limited movement of the pivotal axis of the operating lever lengthwise of the clip.

3. A fastening device comprising a supporting member, an operating lever pivotally mounted thereon and having a hook-shaped portion adapted to engage a loop on a strap or band and subject it to tension, and means for permitting a limited movement of the pivotal axis of the operating lever in the direction of the tension produced by the latter.

4. A fastening device comprising a supporting member, an operating lever pivotally mounted thereon and having a hook-shaped portion adapted to engage a loop on a strap or band and subject it to tension, and means for permitting a limited movement of the pivotal axis of the operating lever in the direction of the tension produced by the latter, said hook-shaped portion being provided with a cam adapted to cooperate with the supporting member to overcome said tension in releasing the strap or band therefrom.

JOHN WALTER MAY.